(12) United States Patent
Cheng et al.

(10) Patent No.: US 7,642,453 B2
(45) Date of Patent: Jan. 5, 2010

(54) HOST UNIT CASE OF A COMPUTER CAPABLE OF BEING SET UP EASILY WITH DETACHABLE PLATE-SHAPED PARTS

(75) Inventors: Sheng-Hsiung Cheng, Taipei Hsien (TW); Te-An Lin, Taipei Hsien (TW); Wu-Nan Wang, Taipei Hsien (TW); Chia-Chia Huang, Taipei Hsien (TW)

(73) Assignee: AOPEN Inc., Taipei Hsien (TW)

( * ) Notice: Subject to any disclaimer, the term of this patent is extended or adjusted under 35 U.S.C. 154(b) by 139 days.

(21) Appl. No.: 11/655,278

(22) Filed: Jan. 19, 2007

(65) Prior Publication Data

US 2007/0253171 A1 Nov. 1, 2007

(30) Foreign Application Priority Data

Apr. 26, 2006 (TW) ............................... 95114987 A

(51) Int. Cl.
*H02G 3/08* (2006.01)
(52) U.S. Cl. .................. 174/50; 174/17 R; 174/520; 361/679.01; 361/724; 361/730; 312/223.2
(58) Field of Classification Search ............... 174/50, 174/53, 57, 58, 17 R, 50.51, 50.54, 520; 361/600, 361/601, 679, 683, 724, 730, 752, 796, 679.01, 361/679.02, 725; 312/223.1, 223.2, 223.3; 220/3.2–3.9, 4.02
See application file for complete search history.

(56) References Cited

U.S. PATENT DOCUMENTS

| | | | | |
|---|---|---|---|---|
| 6,166,910 A | * | 12/2000 | Ronberg et al. | 312/223.1 |
| 6,359,217 B1 | * | 3/2002 | Thompson et al. | 174/50 |
| 7,239,510 B1 | * | 7/2007 | Lin | 312/223.2 |
| 7,242,576 B2 | * | 7/2007 | Coster et al. | 361/683 |
| 7,253,360 B2 | * | 8/2007 | Chen et al. | 174/50 |
| 7,283,363 B2 | * | 10/2007 | Lee | 174/50 |

FOREIGN PATENT DOCUMENTS

| | | |
|---|---|---|
| CN | 2674514 Y | 1/2005 |
| TW | 474423 | 1/1989 |
| TW | M246657 | 9/1992 |

* cited by examiner

*Primary Examiner*—Angel R Estrada

(57) ABSTRACT

A host unit case of a computer capable of being set up easily with detachable plate-shaped components includes an upper cover, a lower cover, a front wall, a rear wall, a main board support wall, a first support frame, a second support frame, a connecting plate, a third support frame, a left side plate, a right side plate and a panel. The host unit case is easy to be disassembled as pieces of plates for the smallest volume can be reached at the time of being packaged such that space occupied by the stacked components can be reduced tremendously for saving storage space and lower delivery cost.

7 Claims, 4 Drawing Sheets

HOST UNIT CASE OF A COMPUTER CAPABLE OF BEING SET UP EASILY WITH DETACHABLE PLATE-SHAPED PARTS

BACKGROUND OF THE INVENTION

1. Field of the Invention

The present invention is related to a host unit case of a personal computer and particularly to a built-up type host unit case of a computer.

2. Brief Description of Related Art

The host unit case is employed to receive electronic devices such as a main board, hard disks, optical disk drives, floppy disk drives and power supply device. Usually, the host unit case is set up with an unchangeable structure. The composite type host unit case has prior art such as U.S. Pat. No. 6,961,236 and Taiwan Utility model publication No. M258544. U.S. Pat. No. 6,961,236 discloses a computer chassis and Taiwan Utility model publication No. M258544 discloses a host unit case to meet specifications of ATX and BTX.

Following prior art is belonged to a further type for the host unit case is made available for being disassembled into several parts before being set up as the host unit case. Taiwan Patent Publication Nos. 468811 discloses a host unit case for an industrial computer. Taiwan Patent Publication No. 474423 discloses a computer chassis free from aid of hand tools. Taiwan Patent Publication No. 490120 discloses a composite type computer chassis. Taiwan Patent Publication No. 531142 discloses a composite type computer chassis assembly.

Further, the computer chassis free from aid of hand tools disclosed in Taiwan Patent Publication No. 474423 provides the front and rear cover plates, which are pivotally joined to a bottom plate with head pins, two frame plates for a big floppy disk drive, which are pivotally joined to the front and rear cover plates, and a cover plate for a small floppy disk drive is assembled to a frame plate and is fixedly hung to the bottom of frame plate for the big floppy disk drive. Further, four L shaped plates are fixed at four corners of the bottom plate to be joined to the two cover plates firmly. Finally, two lateral cover plates are hooked to the lateral sides of the preceding structure and fastened with set screws after the main board and the power supply frame being mounted to the preceding structure to complete the whole assembly of the computer chassis. The parts of the computer chassis are packaged separately such that less space is required for storage.

However, the parts of the preceding prior art are divided into several part groups and the parts are not plate-shaped completely. Further, new parts have to be added for setting up the host unit case so that the whole package of the parts occupies a large space.

SUMMARY OF THE INVENTION

The crux of the present invention is to develop a host unit case, which is capable of reducing the volume thereof after being packaged for lowering delivery cost and decreasing storage space.

The primary object is to provide a host unit case of a computer capable of being set up easily with plate-shaped components with which all components can be gathered as a package with small volume for lowering delivery cost and decreasing storage space.

Accordingly, the host unit case of a computer capable of being set up easily with detachable plate-shaped components, which is reduced volume thereof effectively while packaging, comprising:

an upper cover;
a lower cover;
a front wall, providing the upper end and lower end thereof to be joined to the upper cover and the lower cover respectively;
a rear wall, providing the upper end and lower end thereof to be joined to the upper cover and the lower cover respectively;
a main board support wall, providing the upper and lower end thereof to be joined to the upper cover and the lower cover; and
a first support frame, providing the upper and lower end thereof to be joined to the upper cover and the lower cover for a main structure being formed;

wherein, the upper cover, the lower cover, the front wall, the rear wall, the main board support wall and the first support frame are plate-shaped such that a greatly reduced volume is obtained while packaging is performed.

BRIEF DESCRIPTION OF THE DRAWINGS

The present invention can be more fully understood by reference to the following description and accompanying drawings, in which.

DETAILED DESCRIPTION OF THE INVENTION

Figure 1:
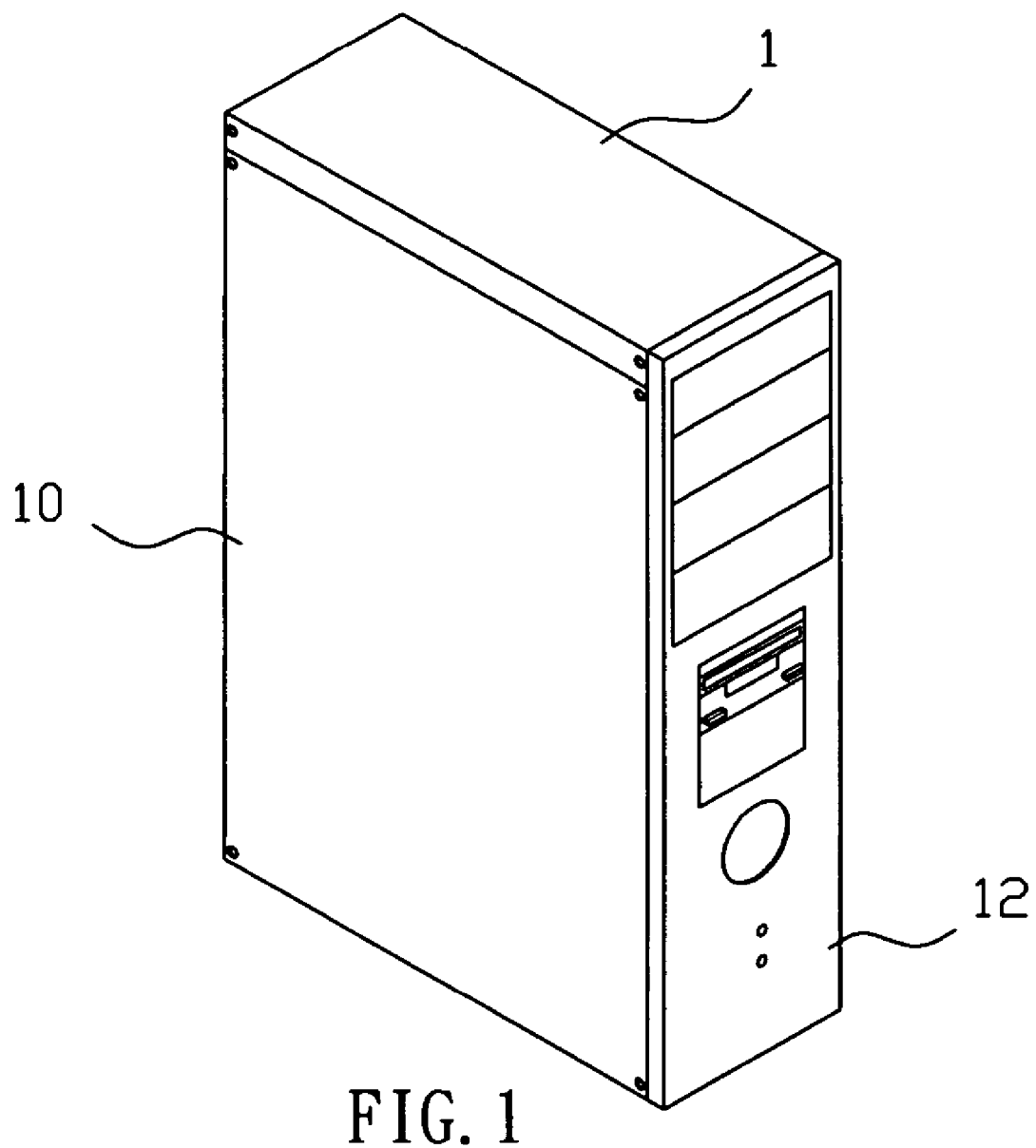
FIG. 1 is a perspective view of a preferred embodiment of a host unit case of a computer capable of being set up easily with plate-shaped components according to the present invention the present invention.
Figure 2:
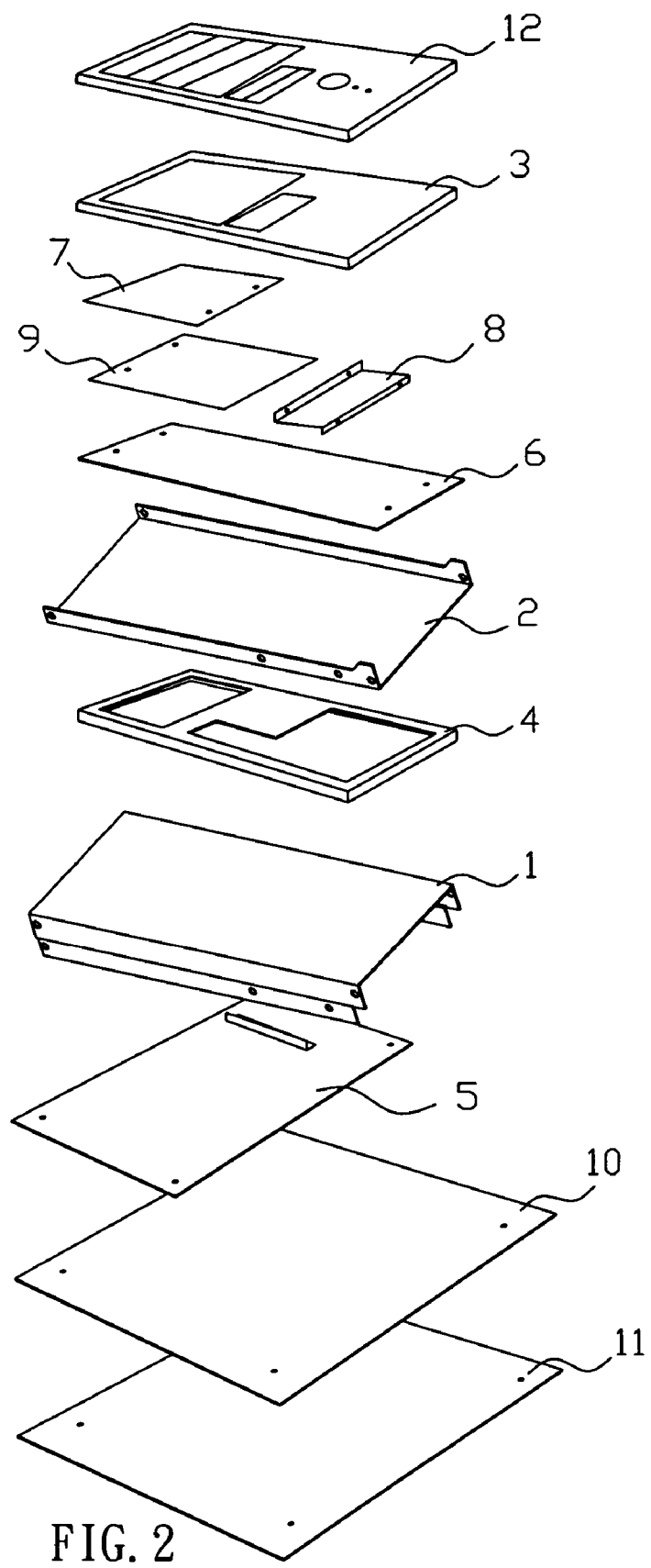
FIG. 2 is a perspective view illustrating all components of preferred embodiment of the present invention shown in FIG. 1 being in a state of separating from each other.

Referring to FIGS. 1 and 2, a host unit case of a computer capable of being set up easily with plate-shaped components according to the present invention the present invention is capable of being reduced volume thereof for packaging and the host unit case of the present invention includes:

an upper cover 1, a lower cover 2, a front wall 3, a rear wall 4, a main board support wall 5, a first support frame 6, a second support frame 7, a connecting plate 8, a third support frame 9, a left side plate 10, a right side plate 11 and a panel 12. The twelve components provide joining parts for engaging with adjacent components next to them respectively. For instance, the respective component has either holes or projections corresponding to projections or holes of adjacent components next to it for engaging with each other or holes corresponding to holes of adjacent components next to it for engaging with each other by means of screws or catching hooks passing through the corresponding holes during the host unit case being set up with the twelve component parts. The twelve components are plate-shaped and easy to be detached from each other and stacked together as the smallest volume at the time of being packaged such that space occupied by the stacked components can be reduced tremendously for storage or delivery.

Figure 3:
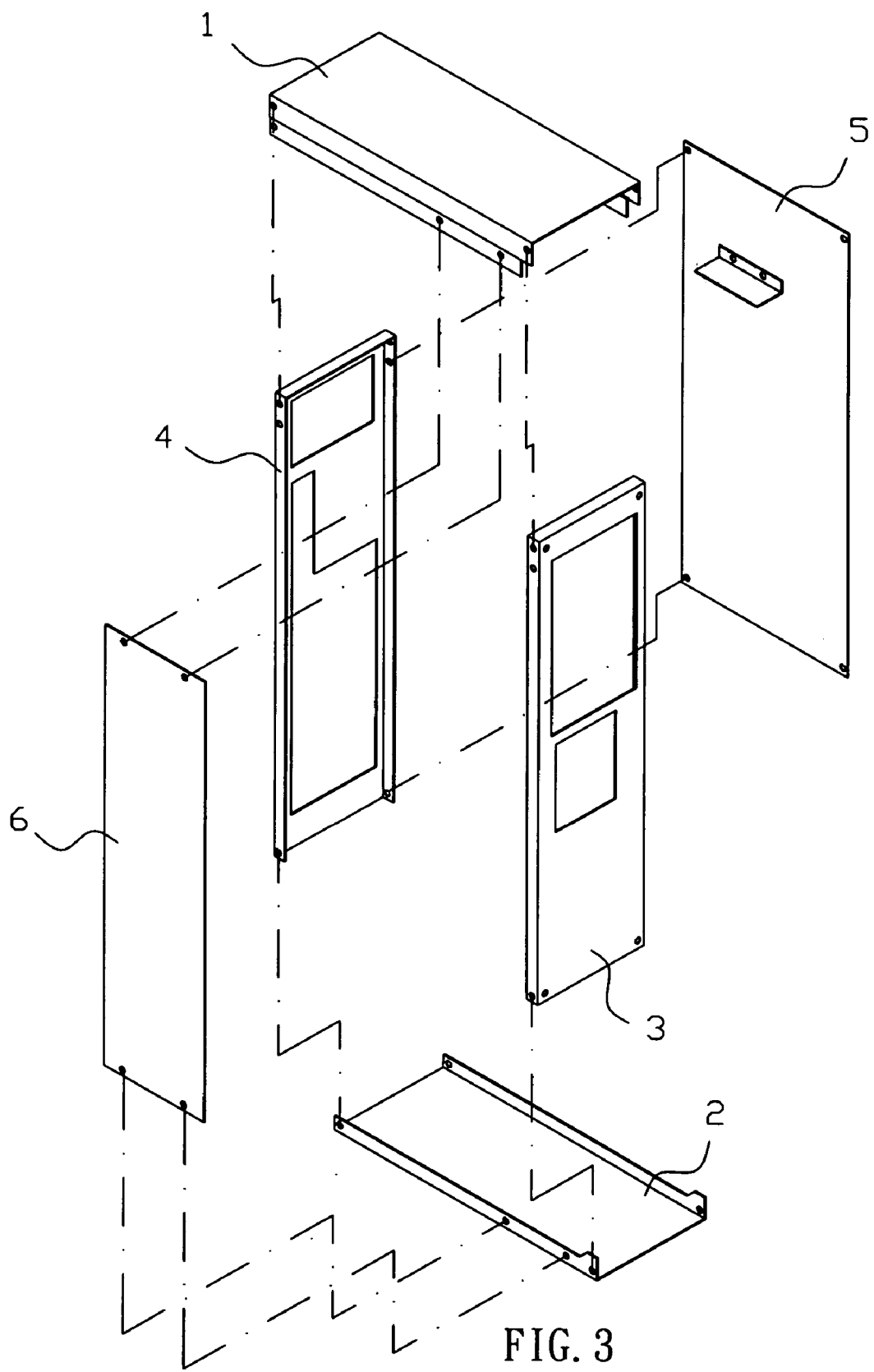
FIG. 3 is an exploded perspective view of main structure of the preferred embodiment of the present invention.
Figure 4:
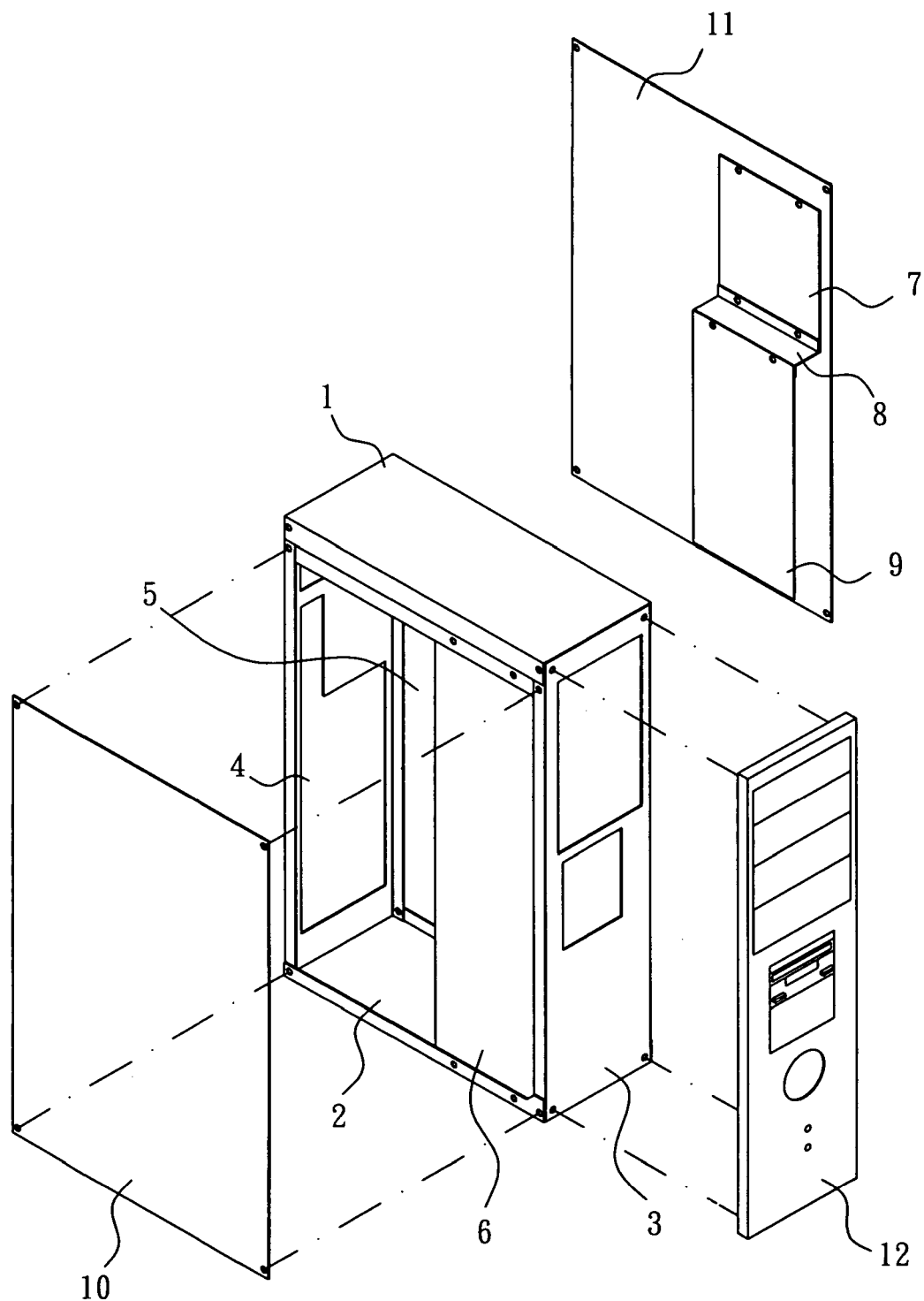
FIG. 4 is a perspective view of the main structure of the preferred embodiment being detached from other components of the present invention.

Referring to FIGS. 1, 3 and 4, when the host unit case is assembled, adjacent components are engaged to each other with the joining parts such as holes engaging with projections or screws or catching hooks passing through corresponding holes first to allow the upper and lower ends of the front wall 3 and rear wall 4 engage with the upper cover 1 and the lower cover 2 respectively. Then, the upper and lower ends of the main board support plate 5 are joined to rear ends of the upper cover 1 and the lower cover 2 respectively and the upper and lower ends of the first support frame 6 are joined to front ends of upper cover 1 and lower cover 2 for setting up the main structure of the host unit case as shown in FIG. 4. Further, the right side plate 11 is joined to the second support frame 7, the lower end of the second support frame 7 is joined to a bent edge of the connecting plate 8, another bent edge of the connecting plate 8 is joined to the upper end of the third support frame 9, the upper and lower ends of the right side plate 11 and the left side plate 10 are joined to the two lateral sides of the upper cover 1 and the lower cover 2 and the panel 12 is attached to the front end of the front wall 3 such that a complete form of the host unit case is set up as shown in FIG. 1.

A large space is between the first support frame 6 and the second support frame 7 for being associated with a first type electronic device such as 5.25" disk drive. A small space is between the first support frame 6 and the third support frame 9 for being associated with a second type electronic device such as 3.25" disk drive.

It is appreciated that the host unit case of a computer capable of being set up easily with detachable plate-shaped components is easy to be disassembled as the smallest volume at the time of being packaged such that space occupied by the stacked components can be reduced tremendously for saving storage space and lower delivery cost.

While the invention has been described with referencing to a preferred embodiment thereof, it is to be understood that modifications or variations may be easily made without departing from the spirit of this invention, which is defined by the appended claims.

What is claimed is:

1. A host unit case of a computer capable of being set up easily with detachable plate-shaped components, which is reduced volume thereof effectively while packaging, comprising:
    an upper cover;
    a lower cover;
    a front wall, an upper and a lower end of the front wall being joined to the upper cover and the lower cover respectively;
    a rear wall, an upper and a lower end of the rear wall being joined to the upper cover and the lower cover respectively;
    a main board support wall, an upper and a lower end of the main board support wall being joined to the upper cover and the lower cover;
    a first support frame, an upper and a lower end of the first support frame being joined to the upper cover and the lower cover for a main structure being formed; and
    a right side plate is joined to the upper cover and the lower cover respectively,
    wherein, the upper cover, the lower cover, the front wall, the rear wall, the main board support wall and the first support frame are plate-shaped such that a greatly reduced volume is obtained while packaging is performed,
    wherein the right side plate is joined to a second support frame; the lower end of the second support frame is joined to a bent edge of a connecting plate; another bent edge of the connecting plate is joined to a upper end of a third support frame; a first type electronic device is disposed between the first and second support frames; a second type electronic device is disposed between the first and third support frames; and the second support frame, the connecting plate and the third support frame are plate-shaped.

2. The host unit case of a computer capable of being set up easily with detachable plate-shaped components as defined in claim 1 further comprises a left side plate is joined to the upper cover and the lower cover respectively.

3. The host unit case of a computer capable of being set up easily with detachable plate-shaped components as defined in claim 1 further comprises a left side plate is joined to the upper cover and the lower cover respectively.

4. The host unit case of a computer capable of being set up easily with detachable plate-shaped components as defined in claim 1 further comprises a left side plate is joined to the upper cover and the lower cover respectively.

5. The host unit case of a computer capable of being set up easily with detachable plate-shaped components as defined in claim 2, further comprises a panel, which is joined to the front end of the front wall, and the panel is plate-shaped.

6. The host unit case of a computer capable of being set up easily with detachable plate-shaped components as defined in claim 3, further comprises a panel, which is joined to the front end of the front wall, and the panel is plate-shaped.

7. The host unit case of a computer capable of being set up easily with detachable plate-shaped components as defined in claim 4, further comprises a panel, which is joined to the front end of the front wall, and the panel is plate-shaped.

* * * * *